(12) United States Patent
Nielander et al.

(10) Patent No.: US 7,611,189 B2
(45) Date of Patent: Nov. 3, 2009

(54) RETRACTABLE GLASS ROOF AND LIFTGATE OPEN AIR VEHICLE SYSTEM

(75) Inventors: Brian Nielander, Royal Oak, MI (US); Michael Shinedling, Oxford, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 47 days.

(21) Appl. No.: 11/923,807

(22) Filed: Oct. 25, 2007

(65) Prior Publication Data

US 2009/0108637 A1 Apr. 30, 2009

(51) Int. Cl.
*B60J 5/10* (2006.01)
*B60J 7/043* (2006.01)

(52) U.S. Cl. ............. 296/146.8; 296/107.2; 296/216.04

(58) Field of Classification Search . 296/107.16–107.2, 296/216.04, 220.01, 56, 146.8
See application file for complete search history.

(56) References Cited

U.S. PATENT DOCUMENTS 4,801,174 A * 1/1989 Hirshberg et al. ...... 296/216.04
6,604,782 B2 * 8/2003 De Gaillard et al. ... 296/216.04

FOREIGN PATENT DOCUMENTS

| EP | 0101322 | * | 2/1984 | ............ 296/216.04 |
| JP | 405058161 | * | 3/1993 | ............ 296/107.17 |

OTHER PUBLICATIONS

"Toyota FT-HS Concept Debuts At The 2007 North American International Auto Show," Jan. 3, 2007, Torrance, CA.

* cited by examiner

*Primary Examiner*—Dennis H Pedder
(74) *Attorney, Agent, or Firm*—Ralph E. Smith

(57) ABSTRACT

A vehicle with a sliding glass roof system capable of operating in multiple modes, such as a rear liftgate, a sunroof, a retractable roof, and a convertible, is provided. The vehicle includes a retractable glass roof, lift glass, and carrier assembly in a single system. In an exemplary embodiment, the vehicle includes a sliding roof panel configured to engage a carrier that also holds and supports a glass cargo liftgate. The sliding roof panel is configured to open in a sunroof and a convertible mode. The glass cargo liftgate is configured to open as a liftgate and in the convertible mode. The sliding roof and liftgate system includes a combination of attachments, gas struts, hinges, latches, seals and the like.

15 Claims, 15 Drawing Sheets

RETRACTABLE GLASS ROOF AND LIFTGATE OPEN AIR VEHICLE SYSTEM

FIELD OF THE INVENTION

The present invention relates generally to vehicles, such as a hard top coupe, and more particularly, the present invention relates to a vehicle with a sliding glass roof panel that engages a carrier supporting a retractable glass carrier liftgate, and the vehicle is operable in a plurality of modes including a liftgate mode, a retract ready mode, a sunroof mode, and a maximum-open air mode.

BACKGROUND OF THE INVENTION

Vehicle roofs can include sunroofs, retractable hard tops, and the like. Additionally, vehicles can include a rear liftgate, such as a hatchback. Disadvantageously, sunroofs limit the amount of open air, and retractable hard tops require styling compromises. Existing vehicles do not include a combination retractable roof and liftgate in a single system which can operate in multiple modes.

BRIEF SUMMARY OF THE INVENTION

In various exemplary embodiments, the present invention provides a retractable roof and liftgate in a single system allowing a vehicle roof to operate in a sunroof mode and in a full open air mode and a vehicle liftgate to open and close. The present disclosure combines attachments, gas struts, hinges, latches, and seals for a liftgate and sliding roof in a single carrier structure. The present disclosure provides a maximum open-air experience in a coupe vehicle while preserving original coupe styling without obstructive cut lines and form changes. In an exemplary embodiment, the liftgate includes a power folding system with a lift glass. Additionally, the present disclosure can operate in an intermediate sunroof function. Advantageously, the vehicle of the present disclosure provides greater body/chassis stiffness and strength over conventional convertibles.

In an exemplary embodiment of the present invention, a retractable roof and liftgate system for a vehicle includes a liftgate attached to a carrier disposed within the vehicle, and a roof configured to slidingly engage the carrier, wherein the retractable roof and liftgate system is configured to operate in a plurality of modes. The retractable roof and liftgate system further includes a carrier folding mechanism attached to the carrier and the vehicle, and the carrier folding mechanism is configured to position the carrier in a first, second, and third position. The plurality of modes include a liftgate mode, a retract-ready mode, a sunroof mode, and a maximum-open air mode. The liftgate mode includes the roof disengaged from the carrier with the carrier in the first position, the liftgate attached to the carrier through one of more rotatable hinges and gas struts, and the liftgate configured to open and close through a latch. The retract-ready mode includes the carrier in the second position exposing a track on the carrier, and the roof configured to slidingly engage the track. The sunroof mode includes the carrier in the second position and the roof slidingly engaged to a position on the track. The maximum-open air mode includes the liftgate and roof engaged on the carrier and the carrier in the third position.

In another exemplary embodiment of the present invention, a vehicle configured to operate in a plurality of modes with a retractable roof and liftgate system includes a carrier disposed within a rear frame of the vehicle, a liftgate attached to the carrier through one or more hinges and gas struts, a roof configured to slidingly engage tracks on the carrier, and a carrier folding mechanism attached to the vehicle and the carrier. The plurality of modes includes a liftgate mode with the roof disengaged from the tracks in a closed position and the liftgate one of open and closed, a retract-ready mode with the carrier folded into a rear interior of the vehicle with the carrier folding mechanism exposing the tracks, a sunroof mode with the roof slidingly positioned on the exposed tracks in an open position, and a maximum-open air mode with the roof fully positioned on the exposed tracks and with the carrier folded substantially inside the rear interior of the vehicle with the carrier folding mechanism. Optionally, the liftgate includes glass, and the liftgate further includes a latch operable to engage a notch on one of the carrier and a rear frame of the vehicle. The vehicle configured to operate in a plurality of modes further includes a motor attached to the carrier folding mechanism, and the motor is operable to automatically move the carrier folding mechanism and the roof. Alternatively, the vehicle configured to operate in a plurality of modes further includes a water management system comprising a trough in the carrier and one or more weather-strips disposed between the carrier, liftgate, and vehicle frame.

In yet another exemplary-embodiment of the present invention, a retractable roof and liftgate method for operating a vehicle in a plurality of modes includes operating the vehicle in a liftgate mode including a roof in a closed position and a liftgate configured to rotatably open and close: for access to a rear interior of the vehicle, engaging a sunroof mode, wherein a carrier attached to the liftgate folds into the vehicle to expose a track and the track is slidingly engaged by the roof for the roof to move to an open position, and engaging a maximum-open air mode, wherein the roof is fully engaged in the open position on the carrier and the carrier folds into the rear interior of the vehicle.

BRIEF DESCRIPTION OF THE DRAWINGS

The present-disclosure is illustrated and-described herein with reference to the various drawings, in which like reference numbers denote like system components, respectively, and in which.

DETAILED DESCRIPTION OF THE INVENTION

In various exemplary embodiments, the present invention provides a vehicle with a roof and liftgate system capable of operating in multiple modes, such as a rear liftgate, a sunroof, a retractable roof, and a convertible. The present invention includes a retractable roof, lift glass, and carrier assembly in a single system. In an exemplary embodiment, the present invention includes a sliding glass roof panel configured to engage a carrier that also holds and supports a glass cargo liftgate. The sliding glass roof panel is configured to open in a sunroof and a maximum-open air (i.e., convertible) mode. The glass cargo liftgate is configured to open as a liftgate for access to the rear interior of the vehicle. The sliding roof and liftgate system includes a combination of attachments, gas struts, hinges, latches, seals and the like.

The present disclosure combines a retractable roof and a liftgate in a single system capable of multiple operation modes. Advantageously, the vehicle of the present disclosure provides greater body/chassis stiffness and strength over conventional convertibles. The present disclosure provides the body stiffness and security of a coupe with the capability to operate in a maximum-open air mode like a convertible.

Figure 1:
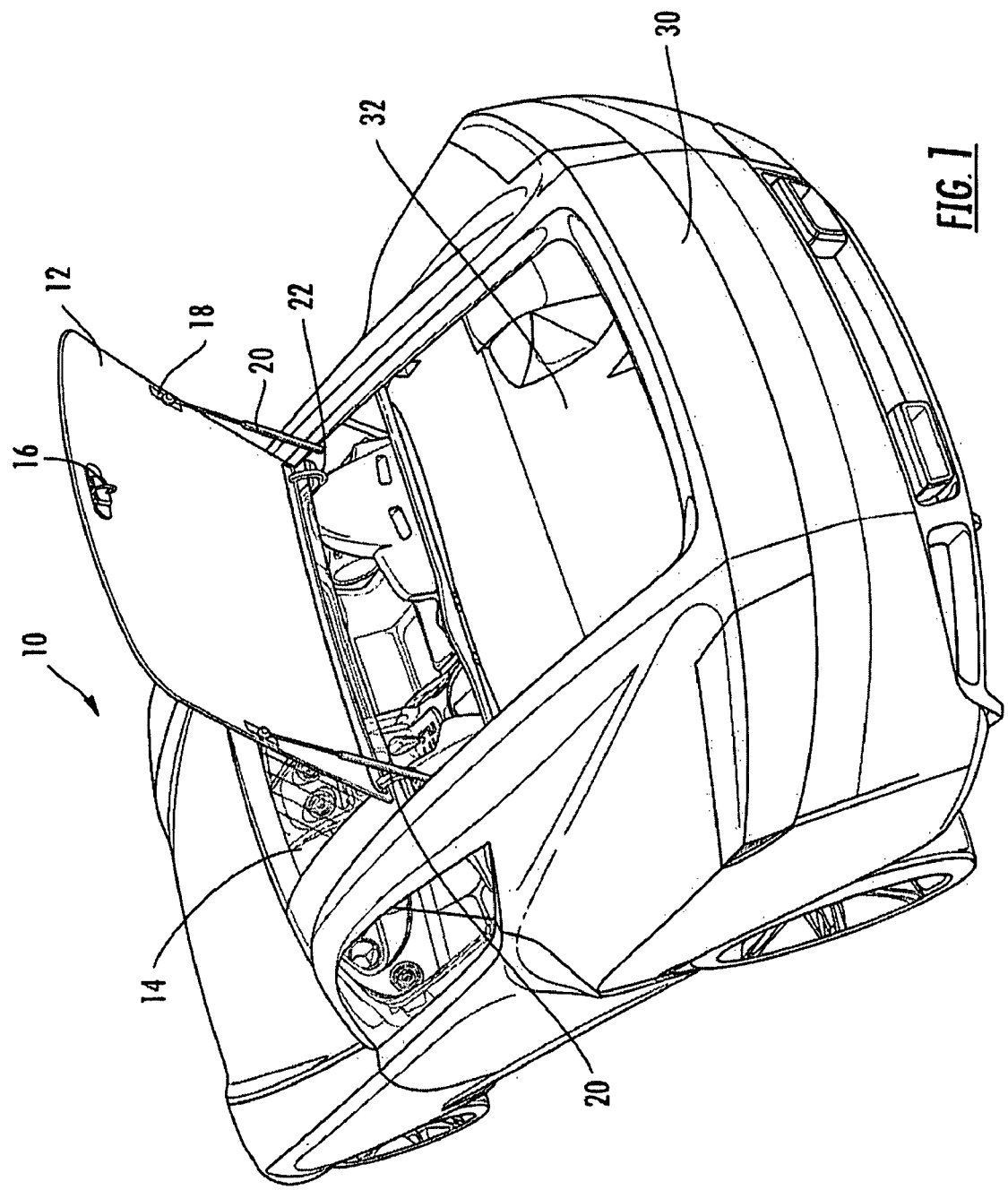
FIG. 1 illustrates a perspective view of a vehicle with a lift glass open, according to an exemplary embodiment of the present disclosure.
Figure 2:
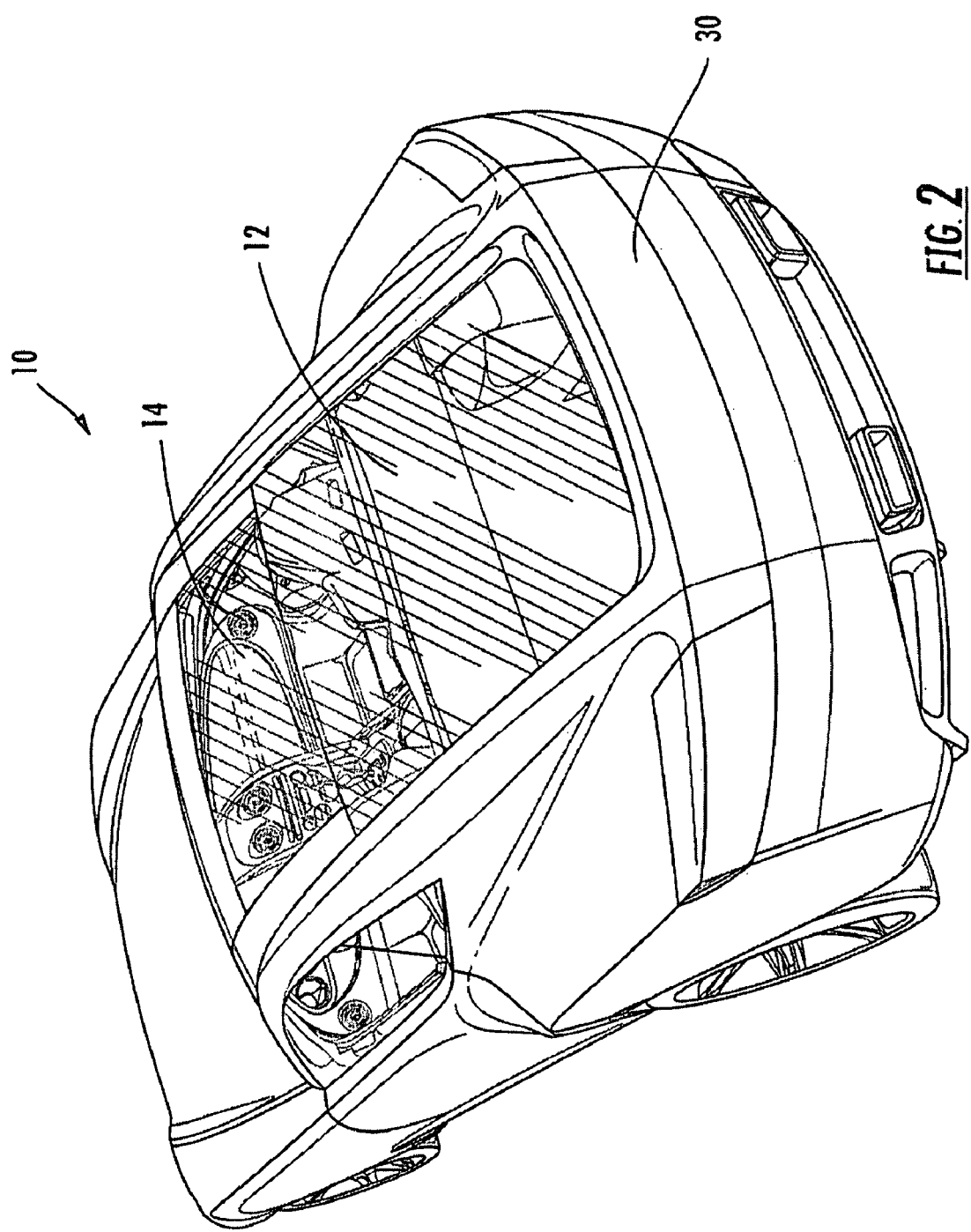
FIG. 2 illustrates a perspective view of the vehicle in FIG. 1 with the lift glass closed, according to an exemplary embodiment of the present disclosure.

Referring to FIGS. 1 and 2, a vehicle 10, according to an exemplary embodiment of the present invention, includes a liftgate 12 and a sliding glass roof 14. The sliding glass roof 14 can be body-color opaque or clear glass. The liftgate 12 can be a glass material or the like, as is known in the art. The liftgate 12 includes a latch 16 and hinges 18. The hinges 18 rotatably connect the liftgate to gas struts 20. The liftgate 12 is also connected to hinges 22. Collectively, the gas struts 20 and hinges 22 connect the liftgate 12 to a rear body 30 of the vehicle 10. The gas struts 20 are configured to provide a gas compression force to assist in opening the liftgate 12, and the liftgate 12 rotatably moves about the hinges 22. The latch 16 is configured to engage a mount on the rear body 30, on a carrier assembly, on a vehicle frame, or the like.

The liftgate 12 in FIG. 1 is illustrated in an open position, and in a closed position in FIG. 2. A person can open and close the liftgate 12 to access a rear interior 32, e.g. cargo area, of the vehicle 10. For example, the liftgate 12 can include a handle (not shown) on the outside, and the handle is operable to release the latch 16. Subsequently, the person can open the liftgate 12 with the gas struts 20 assisting in opening the liftgate 12 along the hinges 22. Alternatively, the liftgate 12 can be automatically opened, such as responsive to a remote key control or a control button on a dashboard.

Figure 3:
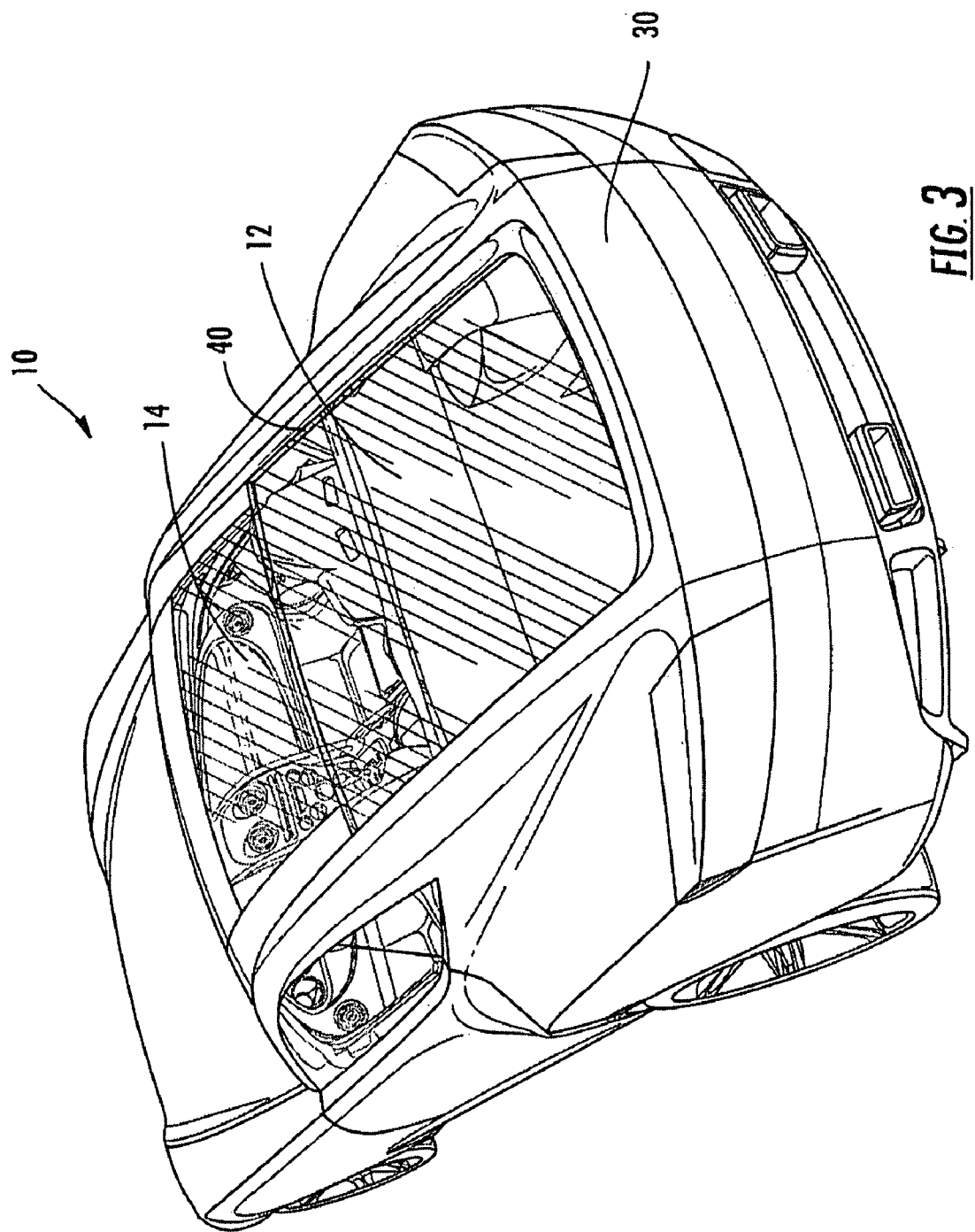
FIG. 3 illustrates a perspective view of the vehicle in a retractable-ready mode with the lift glass in position to engage a carrier, according to an exemplary embodiment of the present disclosure.
Figure 4:
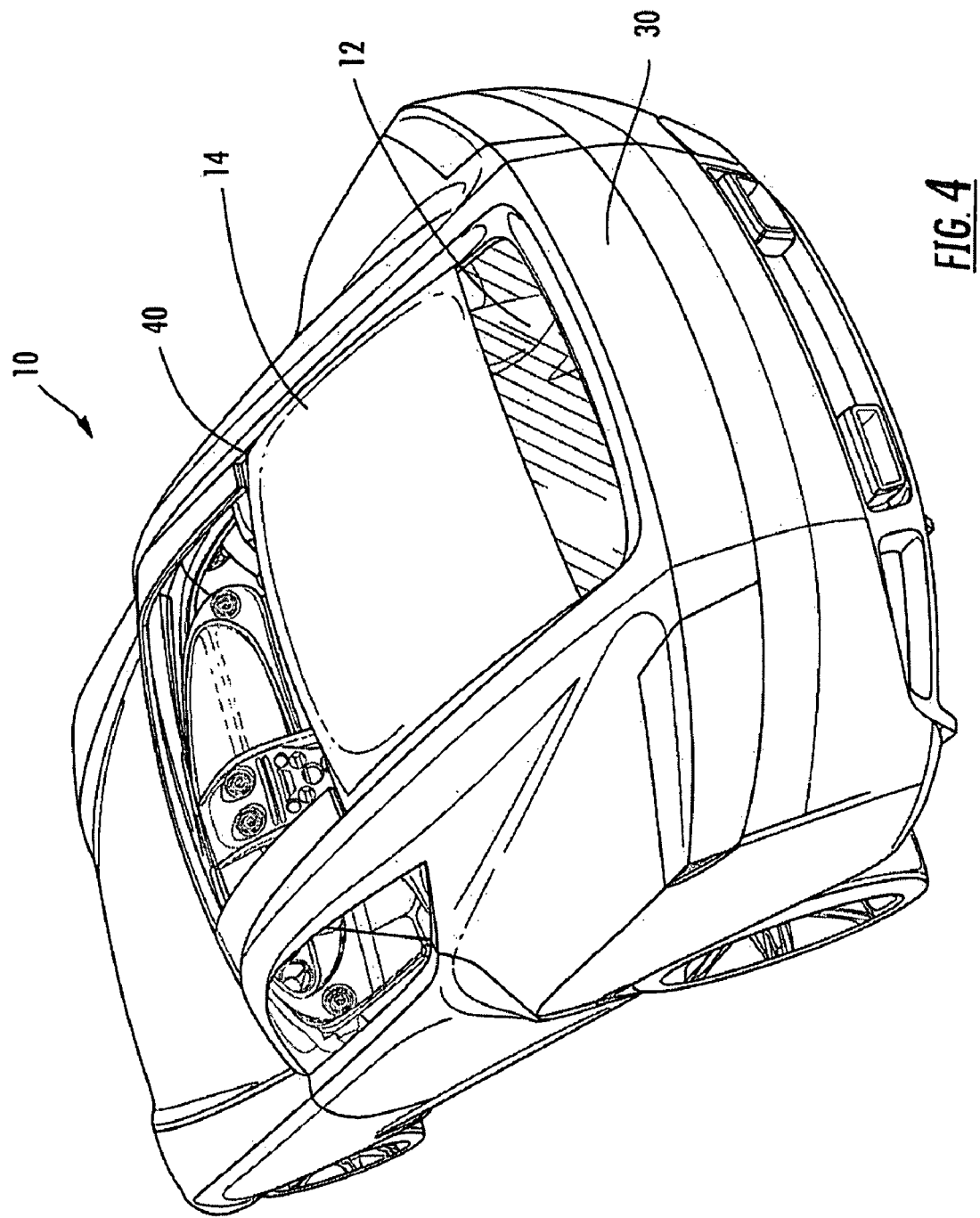
FIG. 4 illustrates a perspective view of the vehicle in a sunroof mode with an upper portion of a roof open, according to an exemplary embodiment of the present disclosure.

Referring to FIGS. 3 and 4, the vehicle 10 is illustrated in a retract-ready mode in FIG. 3 and in a sunroof mode in FIG. 4, according to an exemplary embodiment of the present invention. In FIG. 3, the liftgate 12 is retracted slightly into the vehicle rear interior 32. The liftgate 12 is disposed on a carrier (not shown) which is configured to retract the liftgate 12 into the vehicle 10. Once the liftgate 12 is retracted, a rail 40 is exposed on both sides of the vehicle 10. In FIG. 4, the sliding roof 14 is shown in an open position. The sliding roof. 14 engages-the rail 40 and slides to the rear of the vehicle 10 for the sunroof mode. Here, both the liftgate 12 and the sliding roof 14 are engaged on the carrier. In the sunroof mode of Figure.4, the vehicle 10 is in position for the carrier to retract into the vehicle rear interior 32 for a maximum open-air mode. Preferably, the sliding roof 14 includes clear glass allowing an unobstructed rear view in the sunroof mode. Alternatively, the sliding roof 14 can be body-color opaque and be configured to provide a clear view when in the sunroof mode.

Figure 5:
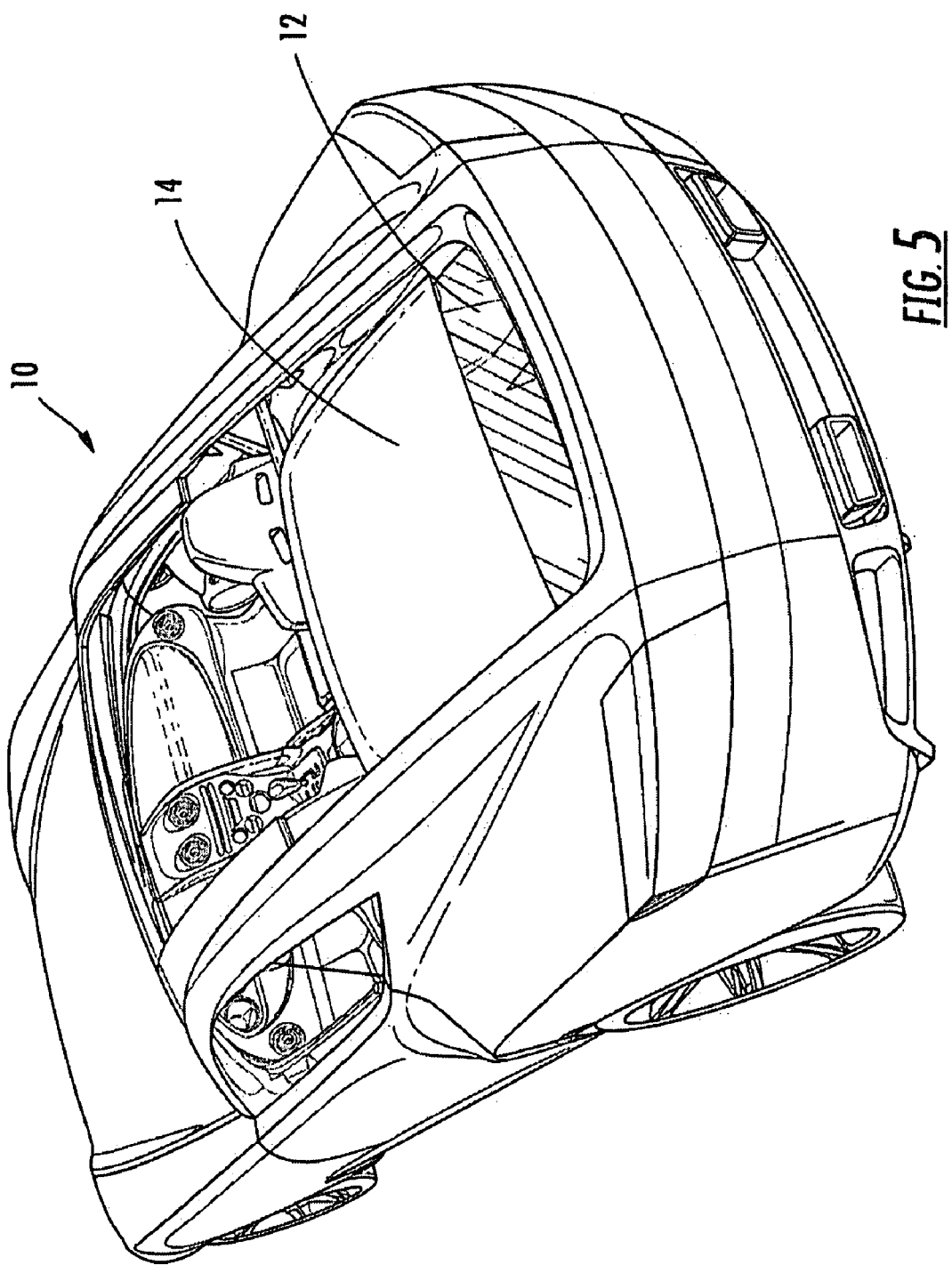
FIG. 5 illustrates a perspective view of the vehicle in a maximum open air mode with the upper portion of the roof open and the rear lift glass engaged in the carrier, according to an exemplary embodiment of the present disclosure.
Figure 6:
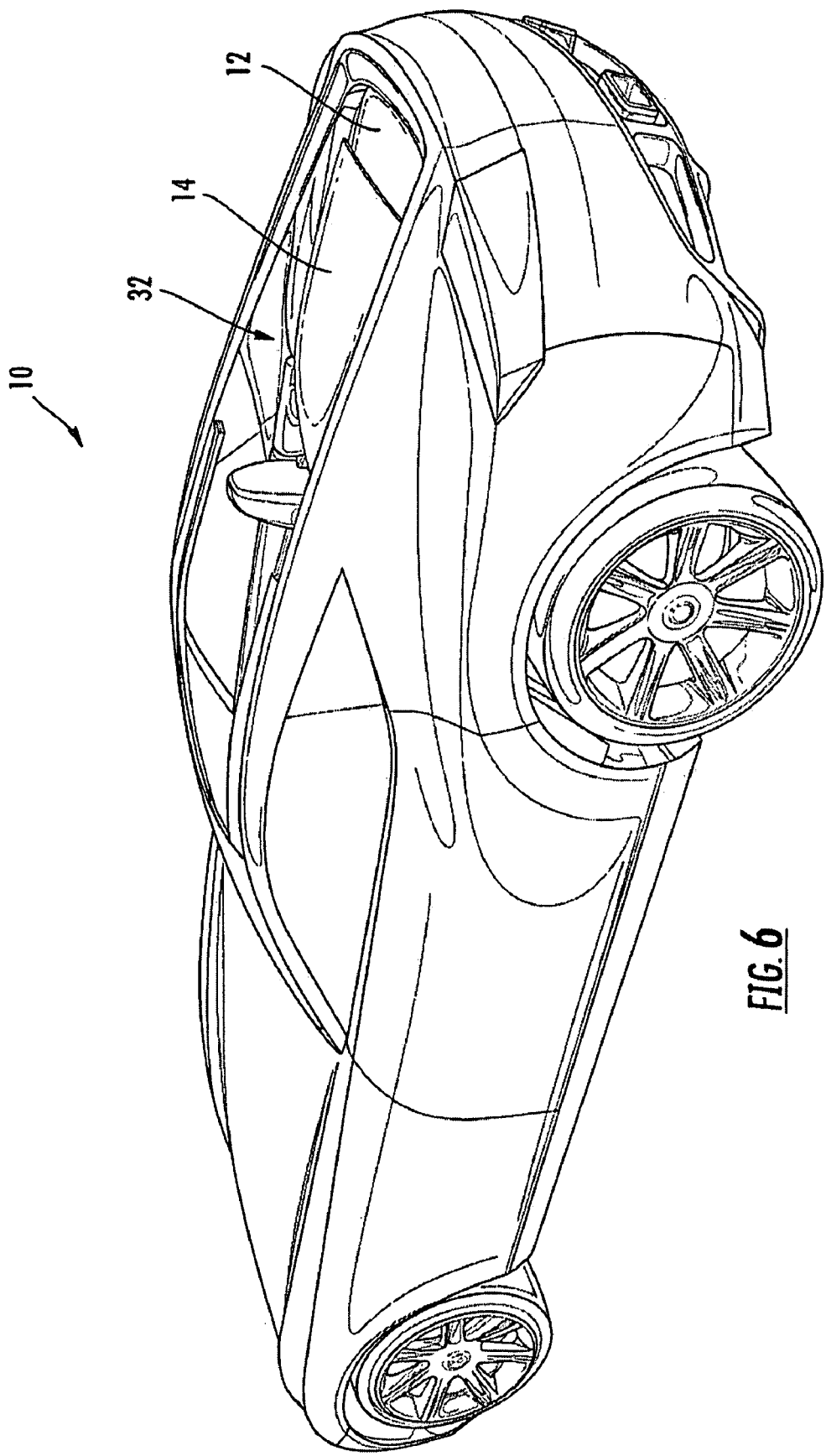
FIG. 6 illustrates a side perspective view of the vehicle of FIG. 5 in the maximum-open air mode, according to an exemplary embodiment of the present disclosure.

Referring to FIGS. 5 and 6, the vehicle 10 is illustrated in a maximum-open air mode, according to an exemplary embodiment of the present invention. FIG. 5 is a rear perspective view of the vehicle 10, and FIG. 6 is a side perspective view. In the maximum-open air mode, the liftgate 12 and the sliding roof 14 are rotated on the carrier into the rear interior 32 of the vehicle 10. To enter the maximum open-air mode, the vehicle 10 enters the retract-ready mode (FIG. 3) and then the sunroof mode.(Figure 4). Once in the sunroof mode, the liftgate 12 and sliding roof 14 are rotated into the rear interior 32 on the carrier.

Figure 7:
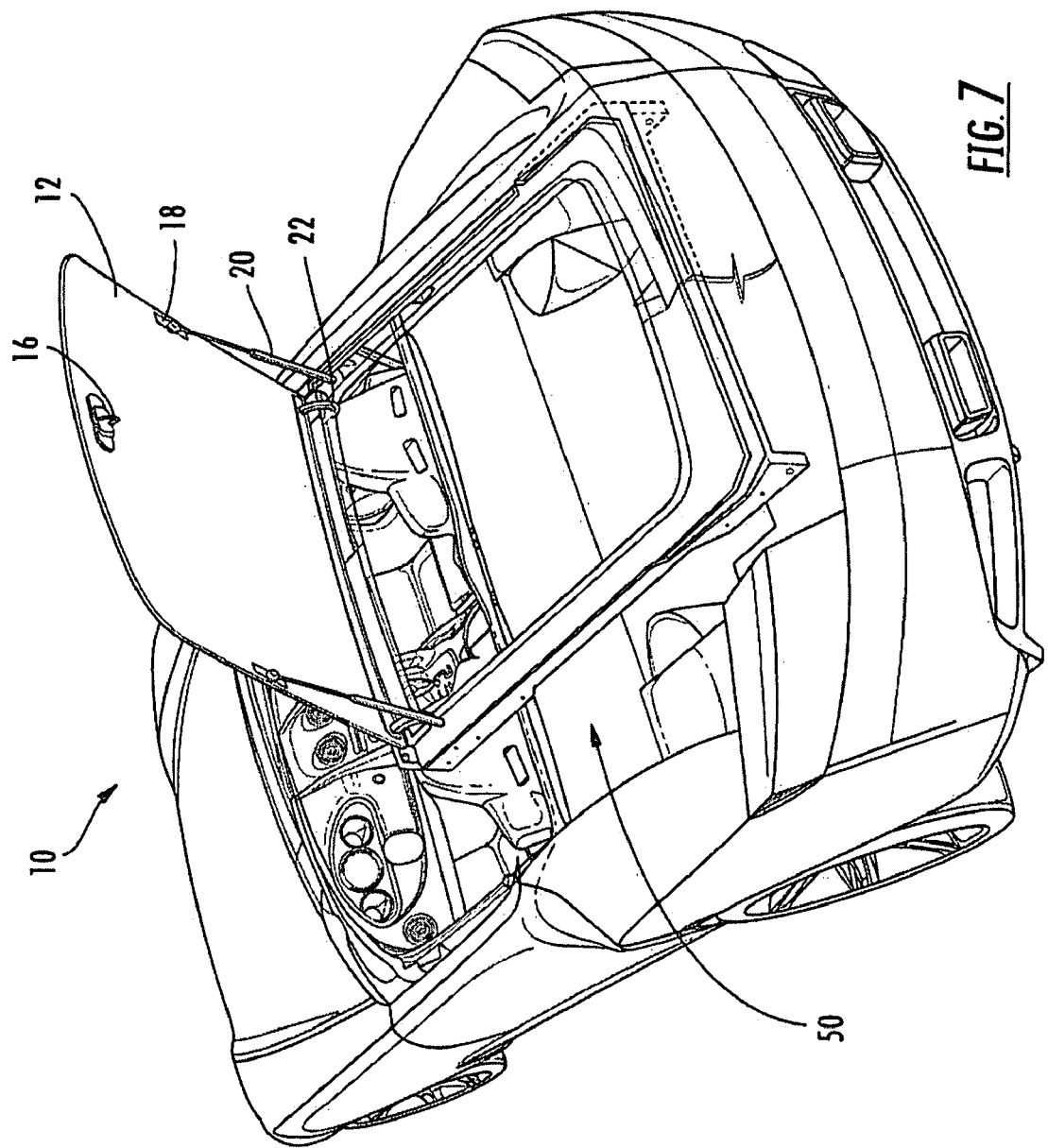
FIG. 7 illustrates a perspective view of components associated with the lift glass open in the vehicle, according to an exemplary embodiment of the present disclosure.
Figure 8:
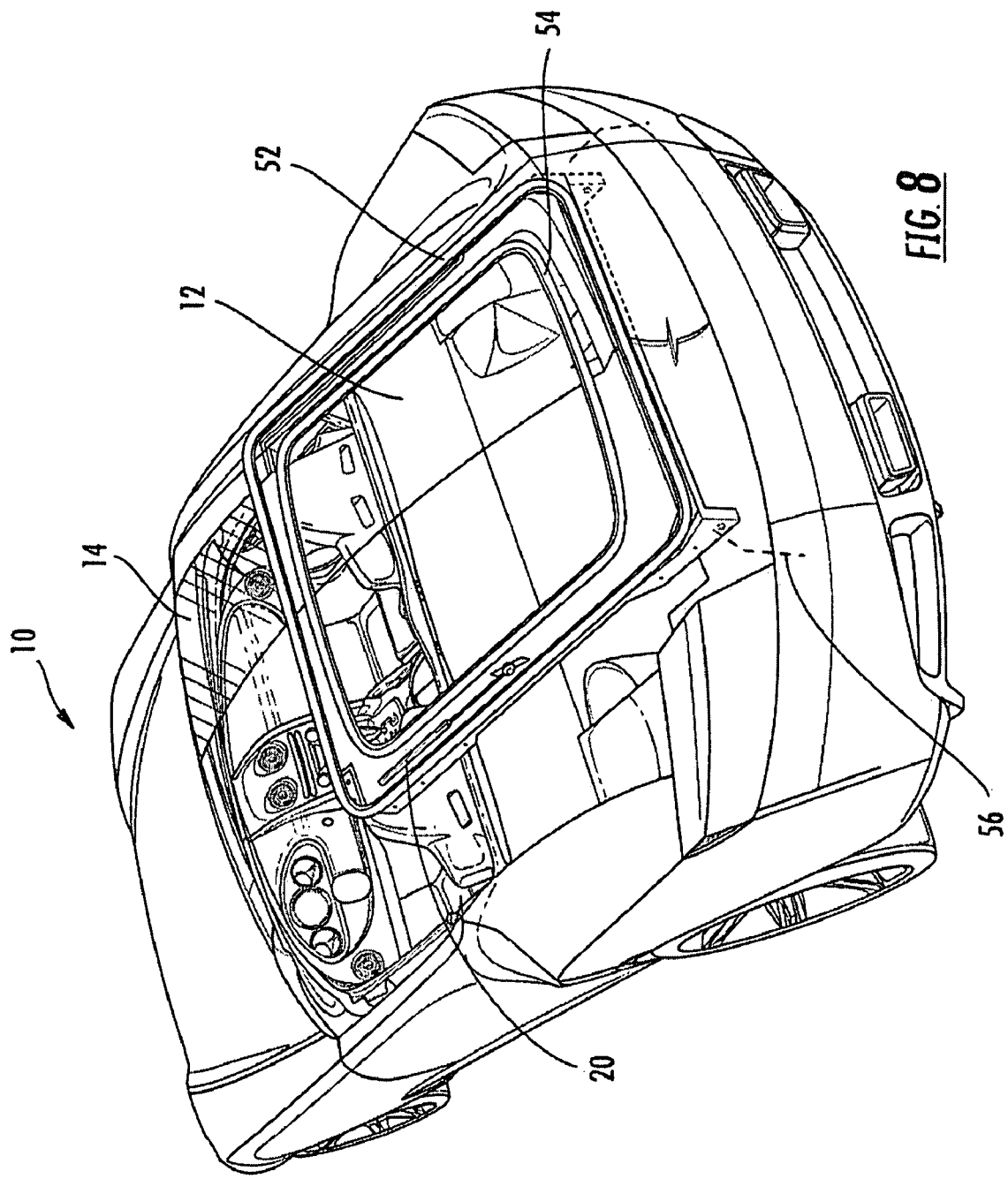
FIG. 8 illustrates a perspective view of components associated with the lift glass closed in the vehicle, according to an exemplary embodiment of the present disclosure.

Referring to FIGS. 7 and 8, the vehicle 10 includes a carrier 50 disposed within the rear body 30, according to an exemplary embodiment of the present invention. FIG. 7 illustrates a cross-sectional view of the rear of the vehicle 10 with the liftgate 12 in an open position on the carrier 50. FIG. 8 illustrates a cross-sectional view of the rear of the vehicle 10 with the liftgate 12 in a closed position on the carrier. The carrier 50 is attached to a vehicle frame (not shown) within the rear body 30 of the vehicle 10. The carrier 50 includes attachment devices for the gas struts 20, hinges 22, and latch 22. The carrier 50 can include a composite molding or lightweight metal casting, such as aluminum, magnesium, or the like.

The carrier 50 includes an attachment for two weather-strips-52 and 54. The weather-strips 52 and 54 are operable to seal the connections between the carrier 50 and the rear body 30 and between the carrier 50 and the liftgate 12. Further, the carrier 50 is molded or shaped to include a water management system and water trough to direct water off the liftgate 12 and rear body 30 (shown as direction 56).

Figure 9:
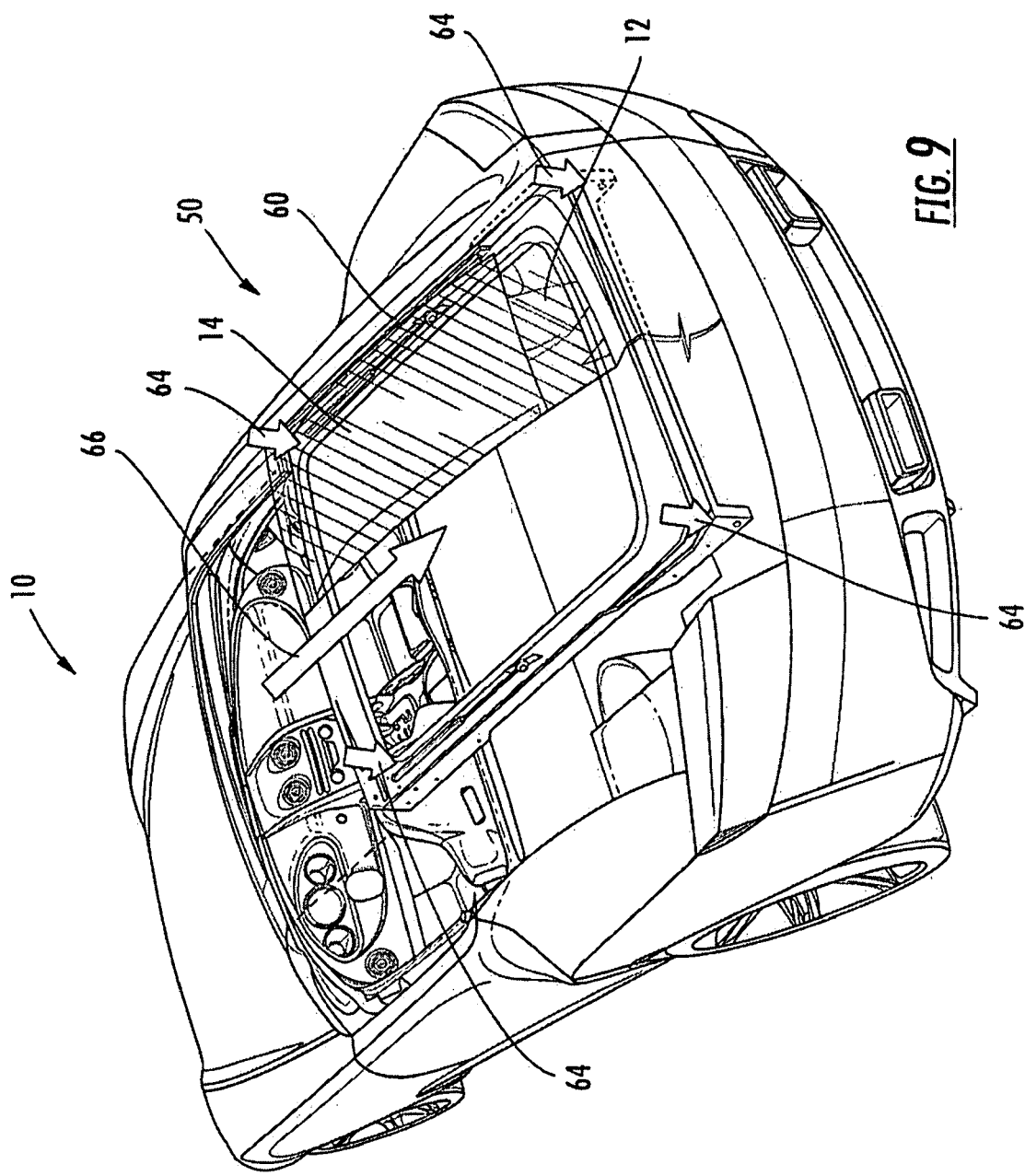
FIG. 9 illustrates the operation of a carrier in the sunroof mode, according to an exemplary embodiment of the present invention.

Referring to FIG. 9, the operation of the carrier 50 is illustrated in the sunroof mode, according to an exemplary embodiment of the present invention. The carrier 50 includes tracks 60 for the sliding roof 14, a mechanism to open and close the sliding roof 14, and a mechanism 62 to retract the carrier 50 into the rear interior 32 of the vehicle 10.

The vehicle 10 enters the sunroof mode in two stages 64 and 66. In the first stage 64, the carrier 50 retracts down (i.e., under-flush) by approximately 20 mm into the rear interior 32 of the vehicle 10. While retracting in the first stage 64, the liftgate 12 is closed on the carrier 50. The retraction lowers the liftgate 12, exposing the tracks 60 on the carrier 10. In the second stage 66, the sliding roof 14 slides along side rails 68 to engage the tracks 60. Once engaged in the tracks 60, the sliding roof 14 slides towards the rear of the vehicle 10 until the sliding roof 14 fully disengages the side rails 68.

The sliding roof 14 is configured to manually or automatically slide on the tracks 60 and the side rails 68 for opening and closing. The mechanism for opening and closing the sliding roof on the carrier 50 can include a motor or the like configured to slide the sliding roof 14 in either direction along the tracks 60 and rails 68. For example, a driver can automatically enter the sunroof mode through a control button on a console in the vehicle. The driver presses the button, the carrier retracts, the sliding roof 14 slides on the side rails 68 responsive to the mechanism, engages the tracks 60, and slides rearward until the sliding roof 14 disengages the side rails 68. Additionally, the side rails 68 can provide water management for front water troughs.

Figure 10:
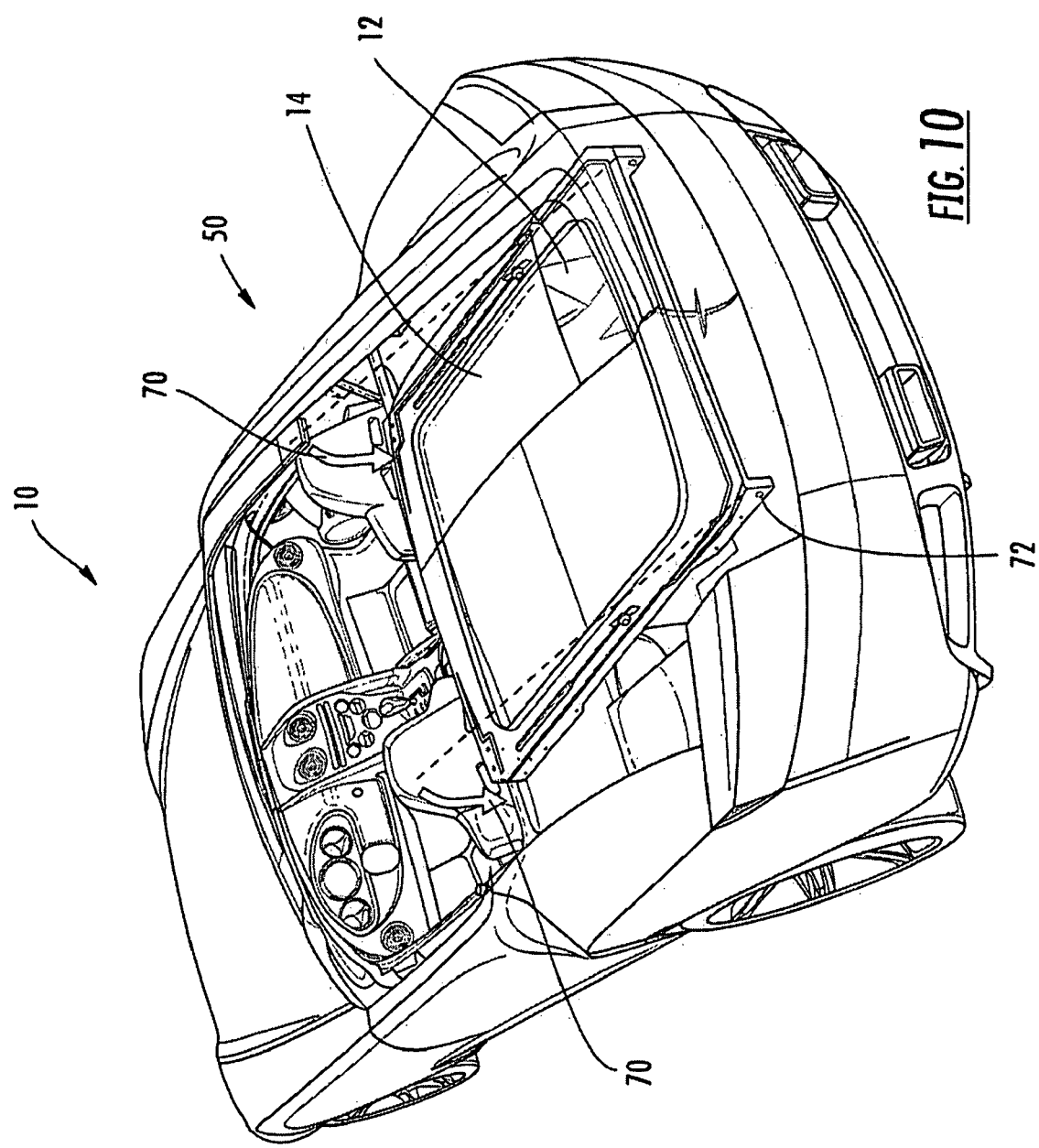
FIG. 10 illustrates the operation of the carrier in the maximum-open air mode, according to an exemplary embodiment of the present invention.

Referring to FIG. 10, the operation of the carrier 50 is illustrated in the maximum-open air mode, according to an exemplary embodiment of the present invention. The vehicle 10 enters the, maximum-open air mode after entering the sunroof mode (as illustrated in FIG. 9) with a third stage 70. The third stage 70 includes the carrier 50 pivoting at a rear point 72. The carrier 50 includes attachments for a folding mechanism and attachments for pivoting at the rear point 72. The pivoting of the carrier 50 folds the liftgate 12 and the sliding roof 14 into the rear interior 32 of the vehicle. In the maximum-open air mode, the vehicle 10 can be operated as a coupester, providing an open-air driving experience.

Figure 11:
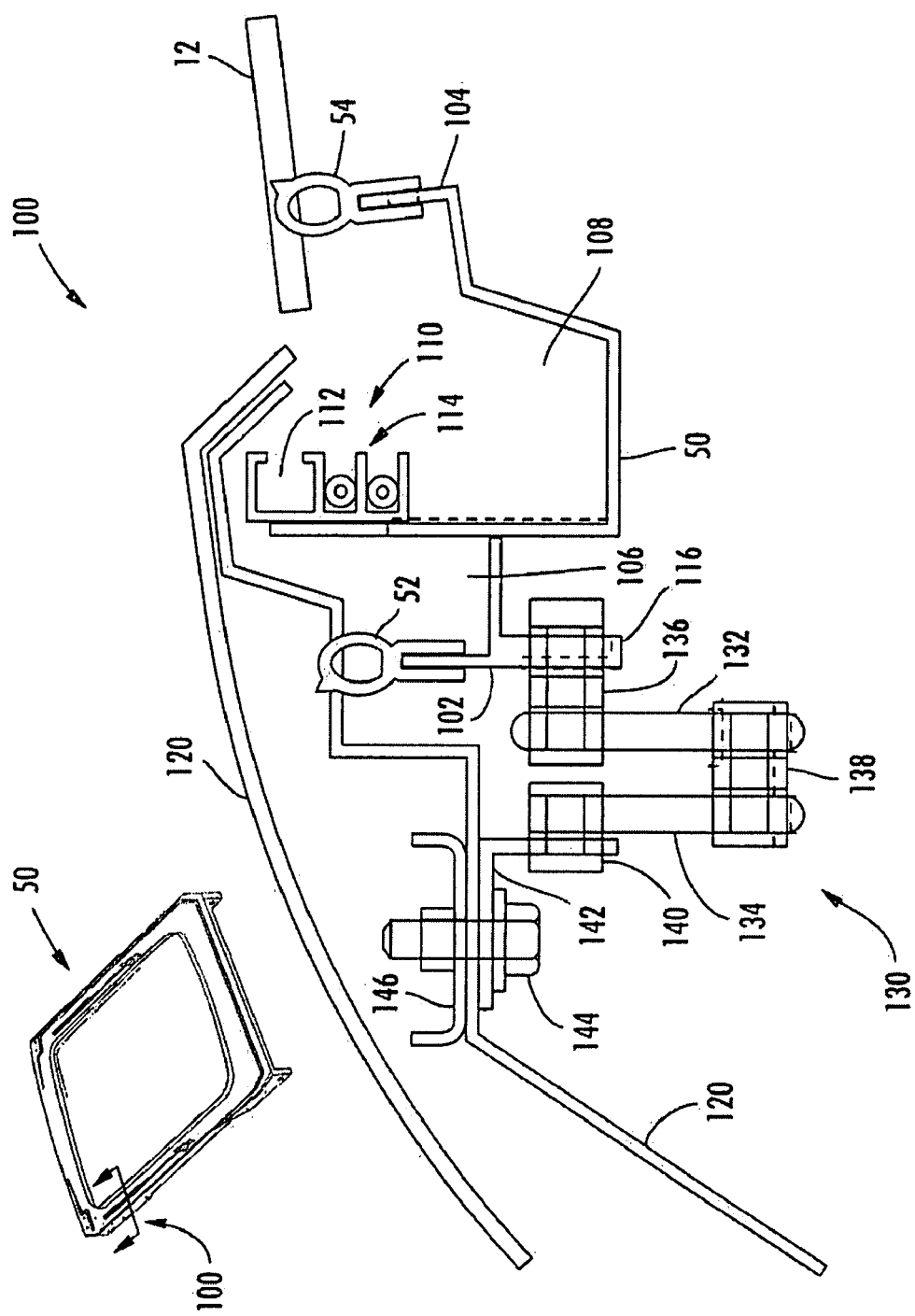
FIG. 11 illustrates the carrier in a cross-sectional view with the liftgate in the closed position, according to an exemplary embodiment of the present invention.

Referring to FIG. 11, the carrier 50 is illustrated in a cross-sectional view 100 with the liftgate 12 in the closed position, according to an exemplary embodiment of the present invention. The carrier 50 includes two walls 102 and 104. The weather-strip 52 is attached to the first wall 102, and the weather-strip 54 is attached to the second wall 104. The liftgate 12 forms a seal with the second weather-strip 54 when closed. The first weather-strip 52 forms a seal with a vehicle body 120.

The carrier 50 further includes two troughs 106 and 108 for water management and roof tracks 110 to engage the sliding roof 14. The troughs 106 and 108 are disposed between the two weather-strips 52 and 54 allowing water to flow towards the vehicle rear. The roof tracks 110 include a rail 112 operable to slidingly engage the sliding roof 14 and cable/wire routing 114 to provide a mechanism to slide the sliding roof 14.

The first wall 102 of the carrier 50 includes an extension 116 attached to a carrier folding mechanism 130. The carrier folding mechanism 130 is configured to retract the carrier 50 as described herein and to-attach the carrier 50 to the vehicle 10. The carrier folding mechanism 130 includes a first and second member 132 and 134 and rotatable joints 136, 138, and 140. The first rotatable joint 136 attaches to the extension 116 and the first member 132. The second rotatable joint 138 attaches to the opposite end of the first member 132 and to the second member 134. The third rotatable joint 140 attaches to the opposite end of the second member 134 and to a bracket 142. The bracket 142 attaches to the vehicle body 120 through a bolt 144. The bolt 144 can include a reinforcement bracket 146 in the connection to the vehicle body 120.

Figure 12:
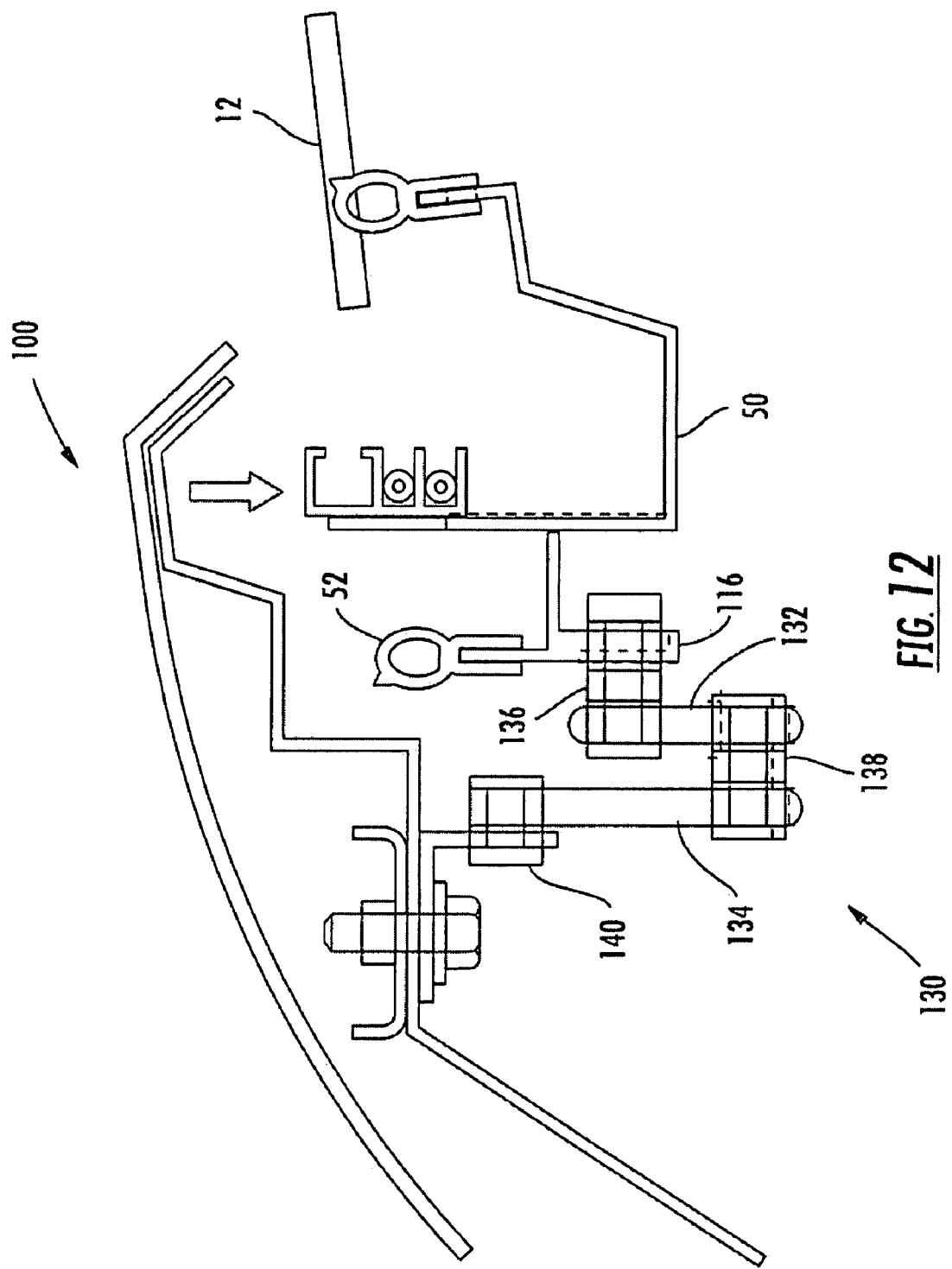
FIG. 12 illustrates the carrier a cross-sectional view with the carrier in the retract-ready mode, according to an exemplary embodiment of the present invention.

Referring to FIG. 12, the carrier 50 is illustrated in the cross-sectional view 100 with the carrier 50 in the retract-ready mode, according to an exemplary embodiment of the present invention. In the retract-ready mode, the carrier folding mechanism 130 is configured to lower the carrier 50 and the liftgate 12 to provide space for the sliding roof 14 to engage the roof tracks 110. The carrier folding mechanism 130 can be attached to a motor or the like configured to rotate the first and second members 132 and 134 thereby moving the rotatable joints 136, 138, and 140 to move the carrier 50 by exerting a force on the extension 116.

Figure 13:
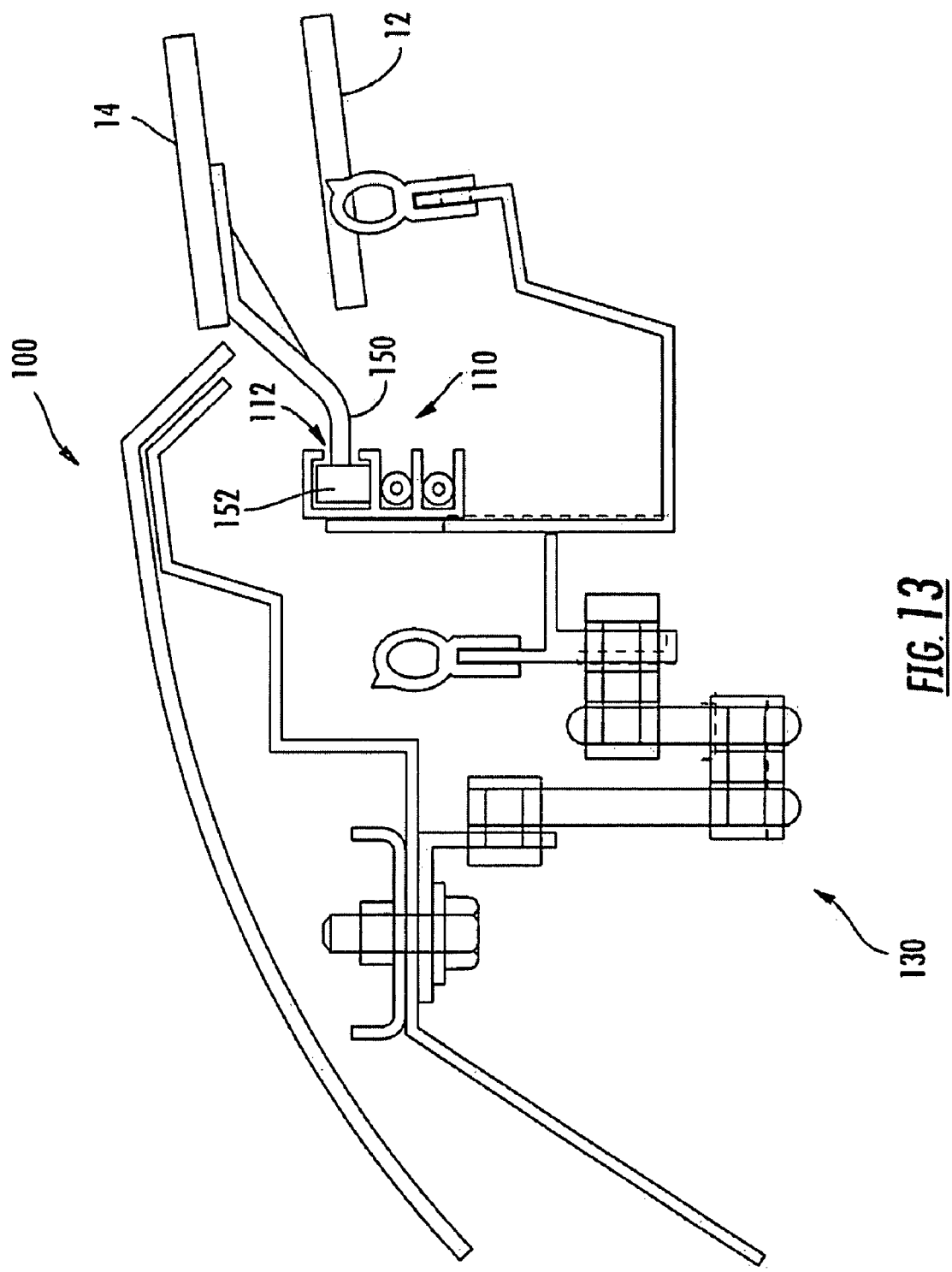
FIG. 13 illustrates the carrier a cross-sectional view with the carrier and the sliding roof in the sunroof mode, according to an exemplary embodiment of the present invention.

Referring to FIG. 13, the carrier 50 is illustrated in the cross-sectional view 100 with the carrier 50 and the sliding roof 14 in the sunroof mode, according to an exemplary embodiment of the present invention. The sliding roof 14 includes a bracket 150 attached to a guide 152. The guide 152 engages the rail 112 on the roof tracks 110 of the carrier 50 for the sliding roof 14 to slide to the rear of the vehicle 10. The vehicle 10 can enter the sunroof mode following the retract-ready mode. In an exemplary embodiment, the sliding roof 14 is moved along the rail 112 through the cable/wire routing 114 which can attach to the sliding roof 14, bracket 150, guide 152, or the like to provide a force along the axis of the rail 112.

Figure 14:
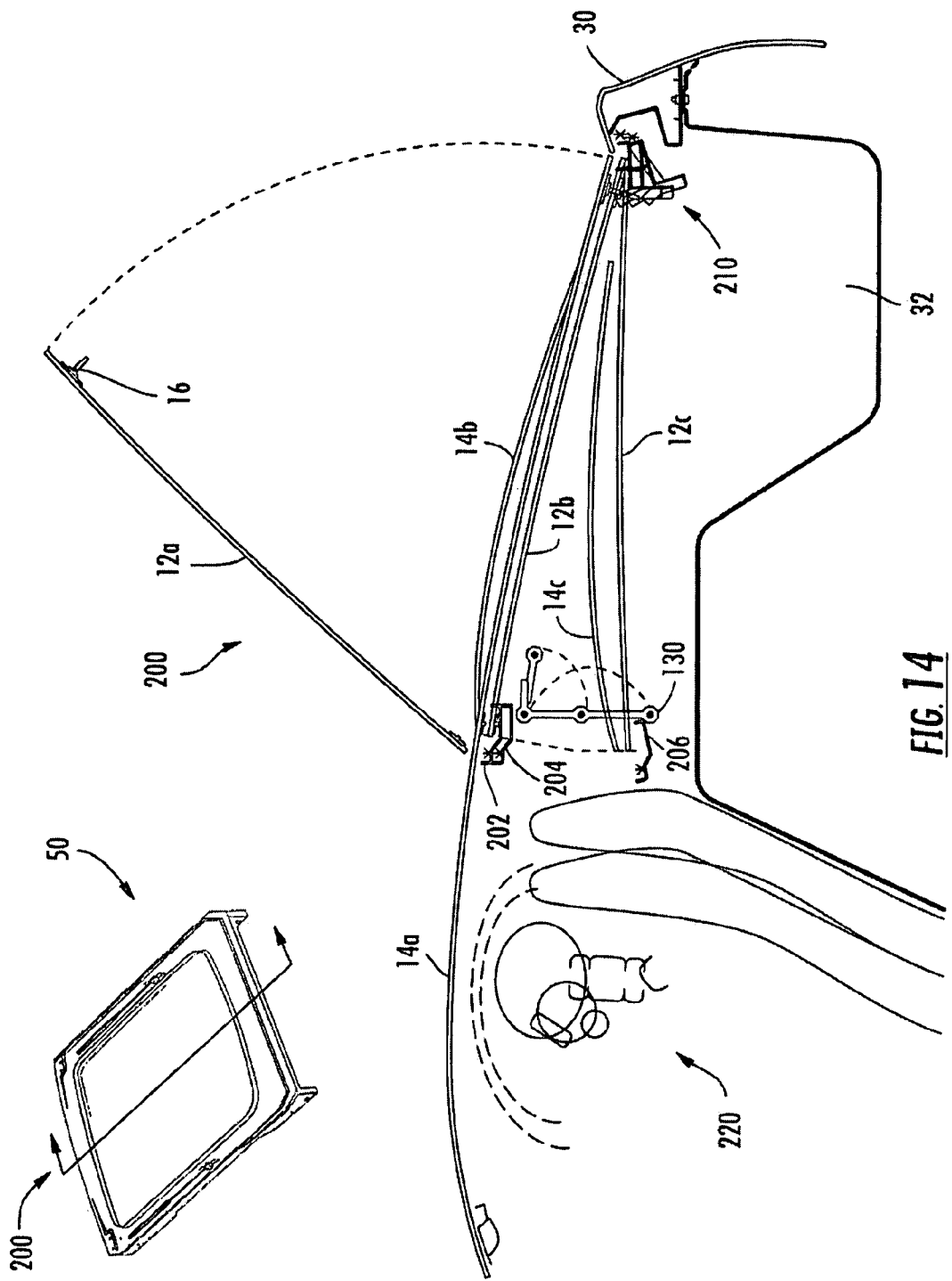
FIG. 14 illustrates the carrier a cross-sectional view depicting the liftgate open, retract-ready, sunroof, and maximum-open air modes, according to an exemplary embodiment of the present invention.

Referring to FIG. 14, the carrier 50 is illustrated in a cross-sectional view 200 depicting the liftgate open, retract-ready, sunroof, and maximum-open air modes, according to an exemplary embodiment of the present invention. The cross-sectional view 200 is a centerline section view of the vehicle 10 and the carrier 50. The liftgate 12 and sliding roof 14 are illustrated in the various modes of the present invention along with the carrier 50 and the carrier folding mechanism 130. The vehicle 10 includes a mount 210 attached to the rear body 30. The mount 210 is configured to engage/disengage the latch 16 on the liftgate.

The liftgate 12a illustrates the relative component positions in the liftgate open mode. Here, the sliding roof 14a is in a closed position over a driver or passenger 220. The carrier folding mechanism 130 is positioned in an upper position 202, engaging the weather-strips 52 and 54. The liftgate 12a is shown open, providing access to the vehicle rear interior 32.

The liftgate 12b and sliding roof 14b illustrate the relative component positions in the sunroof mode. Here, the carrier folding mechanism 130 has positioned the carrier 50 in a middle position 204 to enable the sliding roof 14b to engage the roof tracks 110 on the carrier 50. The sliding roof 14b has been moved towards the vehicle rear body 30, providing an opening above the driver or passenger 220. The retract-ready mode (not shown) includes the same relative component positions as the sunroof mode except that the sliding roof 14 is positioned as shown by sliding roof 14a.

The liftgate 12c and sliding roof 14c illustrate the relative component positions in the maximum-open air mode. Here, the carrier folding mechanism 130 has positioned the carrier 50 in a lower position 206 to move the sliding roof 14c and liftgate 12c relatively flat in the rear interior 32 of the vehicle. The vehicle 10 can operate in the maximum-open air mode to provide a coupester driving experience.

Figure 15:
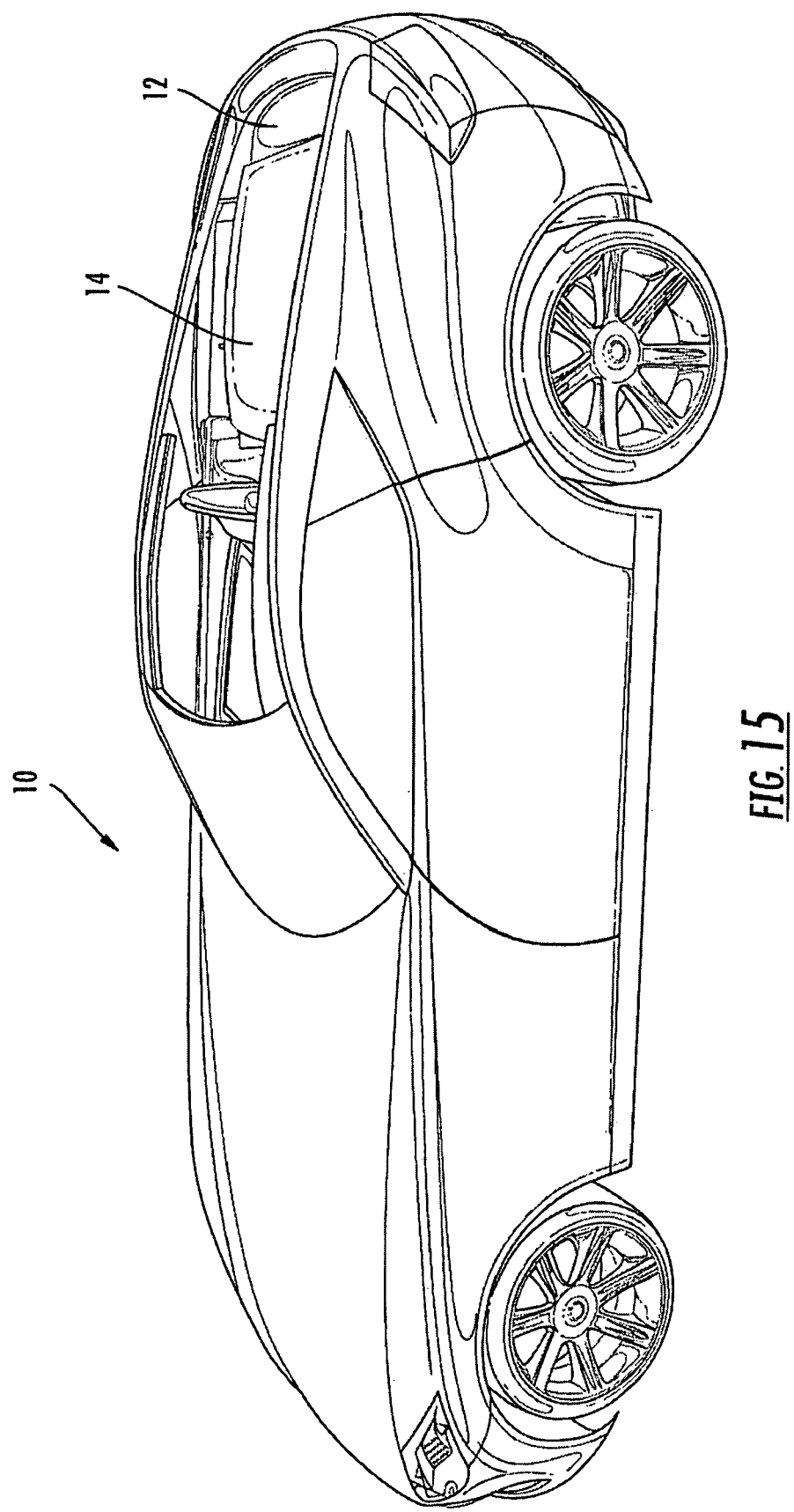
FIG. 15 illustrates the vehicle configured in the maximum-open air mode, according to an exemplary embodiment of the present invention.

Referring to FIG. 15, the vehicle 10 is illustrated configured in the maximum-open air mode, according to an exemplary embodiment of the present invention. Here, the sliding roof 14 is positioned over the liftgate 12 on the carrier 50. The carrier 50 is in the lower position 206 positioning the liftgate 12 and sliding roof 14 inside the rear interior 32 of the vehicle. In the maximum-open air mode, the vehicle 10 operates similar to a convertible while maintaining the style of a coupe.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A retractable roof and liftgate system for a vehicle, comprising:

a liftgate attached to a carrier disposed within the vehicle;
a roof configured to slidingly engage the carrier;
a carrier folding mechanism attached to the carrier and the vehicle, wherein the carrier folding mechanism is configured to position the carrier in a first, second, and third position;
at least one weather-strip disposed between the carrier and a frame of the vehicle: and
wherein the retractable roof and liftgate system is configured to operate in a plurality of modes comprising a liftgate mode, a retract-ready mode, a sunroof mode, and a maximum-open air mode, wherein the liftgate mode comprises the roof disengaged from the carrier with the carrier in the first position, wherein the liftgate is attached to the carrier through at least one of a rotatable hinge and gas strut, wherein the liftgate is configured to open and close using a latch and wherein the carrier provides water management for the vehicle.

2. The retractable roof and liftgate system of claim 1, wherein the retract-ready mode comprises the carrier in the second position exposing a track on the carrier, wherein the roof is configured to slidingly engage the track.

3. The retractable roof and liftgate system of claim 2, wherein the sunroof mode comprises the carrier in the second position and the roof slidingly engaged to a position on the track.

4. The retractable roof and liftgate system of claim 3, wherein the maximum-open air mode comprises the liftgate and roof engaged on the carrier and the carrier in the third position.

5. A vehicle configured to operate in a plurality of modes with a retractable roof and liftgate system, comprising:
a carrier disposed within a rear frame of the vehicle;
a liftgate attached to the carrier through one or more hinges and gas struts;
a roof configured to slidingly engage tracks on the carrier;
a carrier folding mechanism attached to the vehicle and the carrier;
wherein the plurality of modes comprise:
 a liftgate mode with the roof disengaged from the tracks in a closed position and the liftgate one of open and closed;
 a retract-ready mode with the carrier folded into a rear interior of the vehicle with the carrier folding mechanism exposing the tracks;
 a sunroof mode with the roof slidingly positioned on the exposed tracks in an open position; and
 a maximum-open air mode with the roof fully positioned on the exposed tracks and with the carrier folded substantially inside the rear interior of the vehicle with the carrier folding mechanism.

6. The vehicle configured to operate in a plurality of modes: of claim 5, wherein the liftgate comprises glass; and
wherein the liftgate further comprises a latch operable to engage one of the carrier and a rear frame of the vehicle.

7. The vehicle configured to operate in a plurality of modes of claim 5, wherein the carrier folding mechanism is operatively connected to a portion of a body of the vehicle by a plurality of rotatable joints with one of the rotatable joints operatively connected to the portion of the vehicle body and another one of the rotatable joints operatively connected to a portion of the carrier.

8. The vehicle configured to operate in a plurality of modes of claim 5, further comprising a water management system comprising a trough in the carrier and one or more weather-strips disposed between the carrier, liftgate, and vehicle frame.

9. A retractable roof and liftgate method for operating a vehicle in a plurality of modes, comprising:
operating the vehicle in a liftgate mode comprising a roof in a closed position and a liftgate configured to rotatably open and close for access to a, rear interior of the vehicle;
engaging a sunroof mode, wherein a carrier attached to the liftgate folds into the vehicle to expose a track and the track is slidingly engaged by the roof for the roof to move to an open position; and
engaging a maximum-open air mode, wherein the roof is fully engaged in the open position on the carrier and the carrier folds into the rear interior of the vehicle.

10. The retractable roof and liftgate method for operating a vehicle of claim 9, further comprising operating the vehicle in the maximum open-air mode.

11. The retractable roof and liftgate method for operating a vehicle of claim 9, further comprising:
disengaging the maximum-open air mode, wherein the carrier retracts out of the rear interior of the vehicle; and
exiting the sunroof mode, wherein the roof slidingly disengages from the carrier to the closed position.

12. The retractable roof and liftgate system of claim 1 further comprising first, second and third rotatable joints with a first one of the rotatable joints connected to the carrier a second one of the rotatable joints operatively connected to a portion of the body of the vehicle, and a third one of the rotatable joints in operable cooperation with the first one and the second one of the rotatable joints.

13. The retractable roof and liftgate system of claim 1 wherein the retractable roof and liftgate system is configured to operate in the sunroof mode before operating in the maximum-open air mode.

14. The vehicle configured to operate in a plurality of modes of claim 5 further comprising first, second and third rotatable joints with a first one of the rotatable joints connected to the carrier a second one of the rotatable joints operatively connected to a portion of the body of the vehicle, and a third one of the rotatable joints in operable cooperation with the first one and the second one of the rotatable joints.

15. The vehicle configured to operate in a plurality of modes of claim 5 wherein the carrier is configured to provide water management.

* * * * *